(12) United States Patent
Hawthorne (10) Patent No.: US 10,330,072 B2
(45) Date of Patent: Jun. 25, 2019

(54) POWER GENERATING SYSTEMS

(71) Applicant: TIDAL GENERATION LIMITED, Stafford, Staffordshire (GB)

(72) Inventor: Matthew Hawthorne, Bristol (GB)

(73) Assignee: TIDAL GENERATION LIMITED, Staffordshire (GB)

( * ) Notice: Subject to any disclaimer, the term of this patent is extended or adjusted under 35 U.S.C. 154(b) by 318 days.

(21) Appl. No.: 14/897,096

(22) PCT Filed: May 8, 2014

(86) PCT No.: PCT/GB2014/051407
§ 371 (c)(1),
(2) Date: Dec. 9, 2015

(87) PCT Pub. No.: WO2014/199120
PCT Pub. Date: Dec. 18, 2014

(65) Prior Publication Data
US 2016/0138554 A1   May 19, 2016

(30) Foreign Application Priority Data

Jun. 9, 2013 (GB) .................................. 1310237.1

(51) Int. Cl.
*F03B 13/26* (2006.01)
*F03B 3/12* (2006.01)
(Continued)

(52) U.S. Cl.
CPC .............. *F03B 3/128* (2013.01); *B63B 22/06* (2013.01); *F03B 13/26* (2013.01); *F03B 13/264* (2013.01);
(Continued)

(58) Field of Classification Search
CPC .......... F03B 3/128; F03B 13/10; F03B 13/26; F03B 13/264; F03B 15/00; F03B 17/02;
(Continued)

(56) References Cited

U.S. PATENT DOCUMENTS 7,541,688 B2 * 6/2009 Mackie ................... F03B 13/26
290/54
2007/0284882 A1   12/2007 Costin
(Continued)

FOREIGN PATENT DOCUMENTS

GB    2431628 A    5/2007
GB    2486697 A    6/2012

OTHER PUBLICATIONS

Jul. 23, 2014 International Search Report issued in International Patent Application No. PCT/GB2014/051407.
(Continued)

*Primary Examiner* — Carlos A Rivera
*Assistant Examiner* — Sang K Kim
(74) *Attorney, Agent, or Firm* — Dority & Manning, P.A.

(57) ABSTRACT

Power generating equipment includes a support structure adapted to be disposed on the bed of a body of water having a surface above the bed; and a buoyant power generating apparatus having positive buoyancy releasably connectable to the support structure, the power generating apparatus being adapted to be released from the support structure and to make controlled free ascent to the surface of the water following such release.

6 Claims, 11 Drawing Sheets

(51) Int. Cl.
  *F03B 17/02* (2006.01)
  *F03B 17/06* (2006.01)
  *B63B 22/06* (2006.01)
  *F03B 15/00* (2006.01)
  *B63B 35/44* (2006.01)

(52) U.S. Cl.
  CPC .............. *F03B 15/00* (2013.01); *F03B 17/02* (2013.01); *F03B 17/061* (2013.01); *B63B 2035/4466* (2013.01); *F05B 2230/80* (2013.01); *F05B 2240/917* (2013.01); *F05B 2240/97* (2013.01); *Y02E 10/28* (2013.01); *Y02P 70/527* (2015.11)

(58) Field of Classification Search
  CPC .................. F03B 17/061; B63B 22/06; B63B 2035/4466; F05B 2230/80; F05B 2240/917; F05B 2240/97; Y02E 10/28; Y02P 70/527
  See application file for complete search history.

(56) References Cited

U.S. PATENT DOCUMENTS

| | | | |
|---|---|---|---|
| 2009/0045631 A1* | 2/2009 | Gibberd | F03B 13/264 290/53 |
| 2009/0269709 A1* | 10/2009 | Fowler | B63B 22/04 431/1 |
| 2012/0275865 A1 | 11/2012 | Hayman | |
| 2013/0106105 A1 | 5/2013 | Dehlsen et al. | |
| 2014/0348593 A1* | 11/2014 | Kawahara | B66D 1/60 405/224 |

OTHER PUBLICATIONS

Jul. 23, 2014 Written Opinion issued in International Patent Application No. PCT/GB2014/051407.

Dec. 5, 2013 British Search Report issued in British Application No. 1310237.1.

\* cited by examiner

POWER GENERATING SYSTEMS

The present invention relates to power generating systems, and in particular to a method and apparatus for retrieval of at least part of a power generating apparatus from a submerged power generating system.

BACKGROUND OF THE INVENTION

A key aspect in the design of water current and wave power generating systems is the method by which the power generating apparatus is periodically accessed for inspection and maintenance, and deployed again for operation. The choice of access and redeployment technique has a significant effect on the cost of maintaining the entire machine over its lifetime.

Diverse combinations of power generating apparatus, support structure and seabed foundation have been proposed for tidal current and wave devices. Machines that employ a permanently floating, surface breaking power generating apparatus do not have a significant problem in terms of initial access for inspection/maintenance.

However, machines where the power generating apparatus is fully submerged during normal operation must on occasion be brought to the surface for inspection/maintenance. Such inspection and maintenance may possibly take place at the generating site, but more likely, the power generating apparatus will be recovered to a more suitable location, such as a harbour, or dock, for inspection and maintenance. There are currently two basic schemes for such machines:

Schemes employing a surface breaking support structure (such as a mono-pile). The structure itself is used as a guide to allow the power generating apparatus to be raised to the surface using some form of mechanical lifting device (e.g. hydraulic rams, or surface mounted winch).

Schemes where the support structure lies submerged (or mostly submerged) during normal operation. Such devices may consist of:
  a power generating apparatus mounted directly to a seabed foundation;
  a power generating apparatus attached by cables or long articulated arms to foundations on the seabed, wherein the level of the power generating apparatus in the water column during operation is determined by its own positive buoyancy; or
  a power generating apparatus mounted on a submerged lattice or tubular framework structure that supports the power generating apparatus mid water column.

Water current and wave power generating devices are deployed in extreme marine environments where weather and sea state conditions can often make marine operations difficult. The speed and simplicity of the method of deployment and retrieval of the power generating apparatus, and, in particular, the tolerance of this method to moderately bad weather and sea state conditions are, therefore, important.

Conventional methods for retrieving submerged power generating apparatus from the surface include:

A crane or winch mounted on a surface vessel. The vessel required to lower/raise a heavy power generating apparatus is expensive and may not be available at short notice. The constant motion of the vessel on the surface can also pose problems for the positional control of the power generating apparatus.

A telescopic tube normally housed inside the support structure. This telescopic tube guides the negatively buoyant power generating apparatus straight up to the surface. The weight of the power generating apparatus and telescopic tube is supported by a deck mounted winch/crane on a surface vessel. This method addresses the issue of position control of the power generating apparatus, allowing the lifting operation to be performed more quickly and easily. The scheme still requires vessel mounted heavy lifting equipment, and there is a considerable overhead associated with the telescopic tube which is only used on an occasional basis. There is also the possibility of the telescopic tube jamming; with the associated risk that the machine is left in a potentially dangerous state should the weather conditions deteriorate.

Guide wire(s) running from the surface vessel down to the support structure are used to guide the power generating apparatus as it is raised through the water column. The correct tensioning of these guide wires from the support vessel requires accurate position holding and possibly heave compensation equipment, which is expensive. In the case of a water current generating machine, where there is only a short period of relatively slack water available and the recovery of the guide wires is a time consuming operation, for which there may be insufficient time.

An existing method that relates to the deployment and retrieval of power generating equipment is specified in Gibberd et al "A deployment and retrieval apparatus for submerged power generating devices", UK Patent No. GB2431628.

It is therefore desirable to provide a power generating apparatus, such as for example a tidal turbine assembly, and a method of retrieval of power generating equipment from an underwater assembly with improved accuracy, improved reliability and/or reduced cost considerations of retrieval.

SUMMARY OF THE PRESENT INVENTION

According to one aspect of the present invention, there is provided a power generating equipment comprising:
  a support structure adapted to be disposed on the bed of a body of water; and
  a buoyant power generating apparatus having positive buoyancy releasably connectable to the support structure;
in which on release from the support structure, the power generating apparatus makes controlled free ascent to the surface of the water.

According to another aspect of the present invention, there is provided a method of retrieving a buoyant power generating apparatus mounted on a support structure located on a bed of a body of water, comprising:
  releasing the power generating apparatus from the support structure such that the power generating apparatus makes controlled free ascent to the surface of the water.

The term "free ascent" is used herein to refer to the power generating apparatus rising to the surface from an underwater environment without any assistance from an external source, such as for example a winch or an external floatation device.

Advantageously, the present invention provides equipment and a method for the retrieval of power generating apparatus which allows for controlled free ascent of the power generating apparatus without the need for additional costly equipment such as for example winches, cranes, telescopic tubes or guide wires. The present invention therefore advantageously improves the ability to retrieve the apparatus and to reduce the time taken to retrieve the apparatus from an underwater environment.

The term "controlled" is used herein to refer to the power generating apparatus being stable during the free ascent, for example having limited or reduced, for example minimal, roll and pitch during the free ascent. The roll and pitch of the power generating apparatus during the free ascent to the surface is measured by the use of suitable sensors such as one or more inclinometers The stability of the power generating apparatus during the free ascent advantageously reduces the risk of damaging the apparatus or the risk of inversion of the apparatus.

The power generating apparatus can be any suitable apparatus for use in an underwater environment, for example a tidal turbine assembly.

The support structure and the power generating apparatus may be provided with cooperating alignment parts which define a mating axis. The cooperating alignment parts may be adapted to guide the power generating apparatus into engagement with the support structure. The centre of buoyancy of the power generating apparatus may be arranged to be substantially in line with the mating axis prior to such engagement.

The support structure and the power generating apparatus comprise an engagement mechanism for releasably connecting the power generating apparatus to the support structure. The engagement mechanism may be any suitable mechanism for reversibly connecting the power generating apparatus with the support structure.

The engagement mechanism may for example be a clamping mechanism. The support structure may provide one of more clamping portions for engagement with a feature, for example a tubular member, provided by the power generating apparatus. Alternatively, the power generating apparatus may provide one or more clamping portions for engagement with a feature, for example a tubular member, provided by the support structure.

The clamping mechanism may be any suitable clamp, such as for example a three section clamp. The means for clamping may include electrical, hydraulic and fibre optic connectors between the power generating apparatus and the support structure. In an alternative example, such connectors are provided separately from the clamping mechanism.

The equipment may further comprise a first tether having a first end attached to the support structure, and a second end that includes a coupling device for attachment to a coupling device located at an end of a second tether, the first tether being arranged to extend through the power generating apparatus to an upper region thereof. The first tether may include a buoyant element in the vicinity of the coupling device.

This arrangement advantageously enables the release of the power generating apparatus with reduced risk of the coupling falling onto the support substrate causing expensive damage.

The power generating equipment may further comprise an umbilical for supplying electrical power and control signals to the engagement mechanism. The umbilical may have a first end for attachment to the buoyant power generating apparatus and/or to the support structure, and a second end for attachment to a retrieval structure. The retrieval structure may for example be a vessel or may be a structure located on the shore. Preferably, the buoyant power generating apparatus and/or the support structure comprise at least one attachment feature for mutual engagement with an attachment feature provided at the first end of the umbilical. Preferably, the first end of the umbilical is arranged to attach to the buoyant power generating apparatus. A control signal is preferably sent down an umbilical to control the release of the power generating apparatus.

DETAILED DESCRIPTION OF THE PREFERRED EMBODIMENTS

Figure 1:
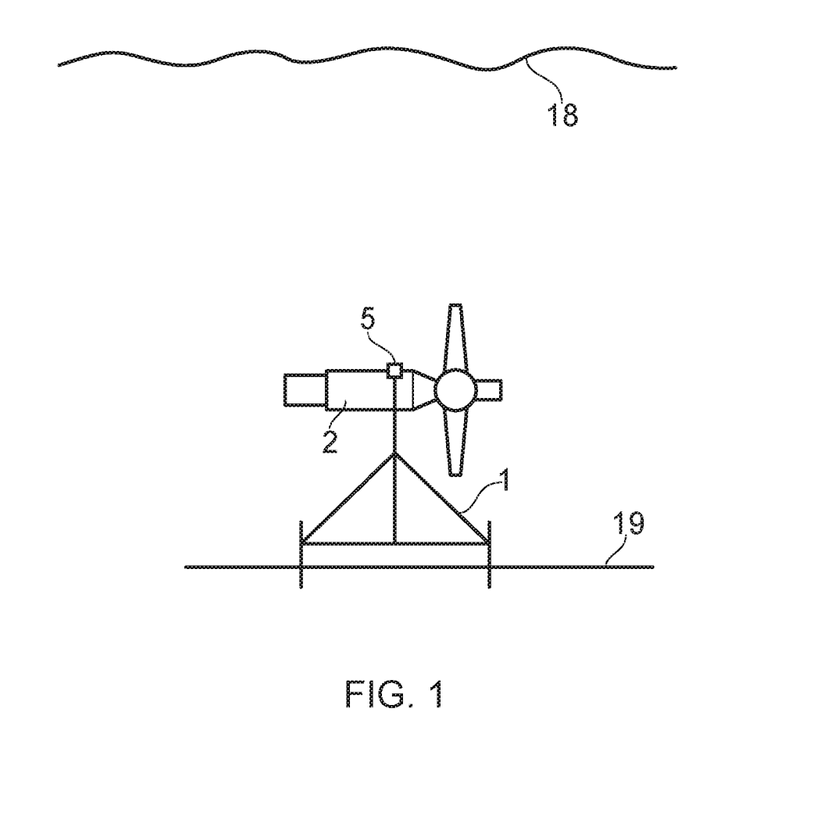
FIG. 1 is a schematic view of a submerged power generating system embodying one aspect of the present invention.

FIG. 1 illustrates a power generating system that comprises a support structure 1 located on a bed 19 of a body of water having a water surface 18. A power generating apparatus 2 is releasably engaged with the support structure 1. The power generating apparatus 2 is positively buoyant.

Deployment of the power generating apparatus onto a support structure 1 will now be described with reference to FIGS. 2a to 2i and 3, which are schematic illustrations and a flow chart respectively. FIGS. 2a to 2i illustrate steps 100 to 116 of FIG. 3 respectively.

Figure 2A:
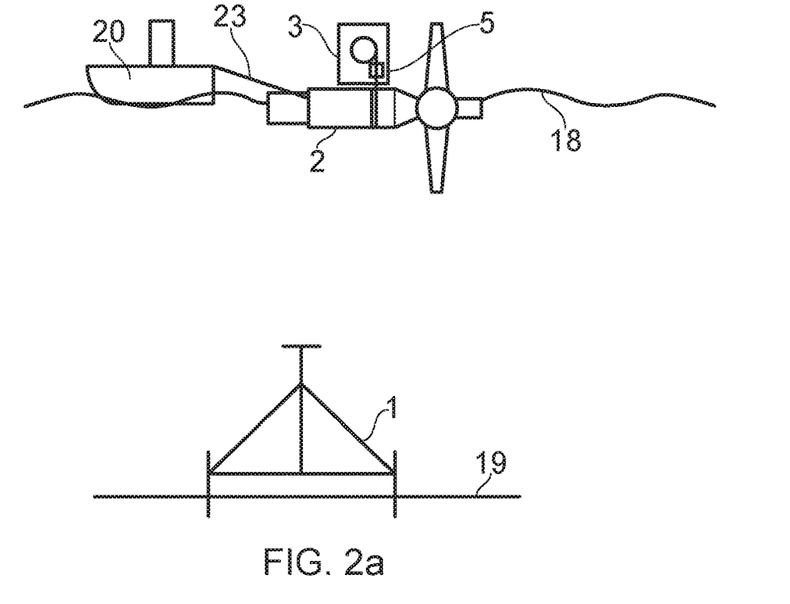
FIGS. 2a to 2i illustrate steps in a method of deploying the system of FIG. 1.

In FIGS. 2a to 2i, the support structure 1 is located on a sea bed 19, and is prepared for the reception of a power generating apparatus 2 to be mounted thereon. In FIG. 2a, the power generating apparatus 2 is towed (step 100) to the location of the support structure 1 by a vessel 20 on the water surface 18. A winching device 3 is mounted on the power generating apparatus 2, such that respective alignment features are aligned, and a latching mechanism is engaged with corresponding features on the power generating apparatus 2.

Figure 2B:
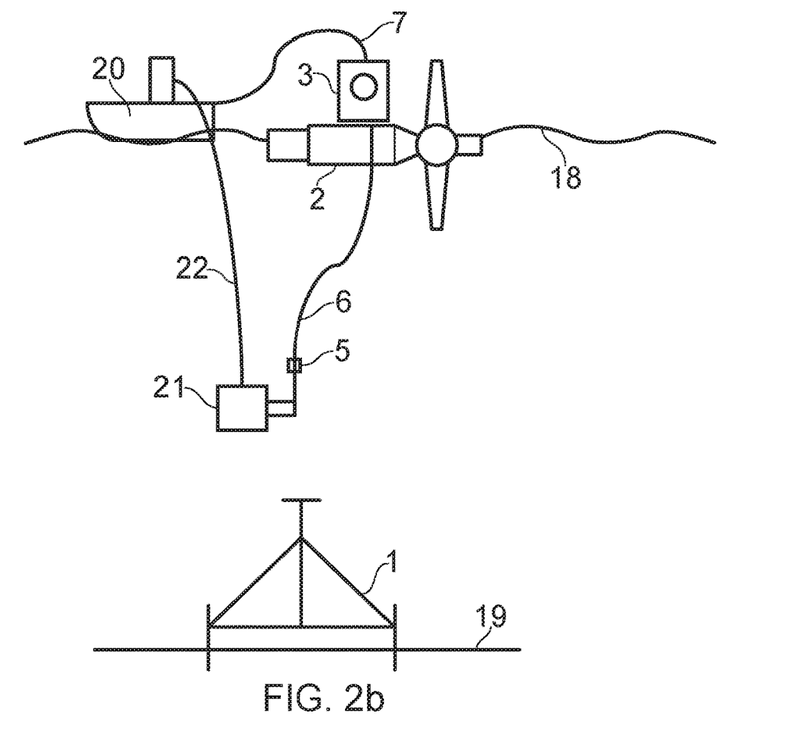

In FIG. 2b, an umbilical 7 connects the vessel 20 to the winching device 3. A remotely operated vehicle (ROV) 21 is deployed (step 102) from the vessel 20 via a control cable 22, and is used to carry a winch tether 6 to the support structure 1. As the ROV 21 descends, the winching unit 3 pays out the winch tether 6. With the winching device 3 mounted on an upper surface of the power generating apparatus 2, the winch tether 6 passes through the power generating apparatus 2, such that the ROV 21 pulls the tether 6 through an aperture in the power generating apparatus 2 as it descends to the support structure 1 on the bed.

In one example, the tether 6 comprises two connected portions, connected to one another by a coupling device 5.

Figure 2C:
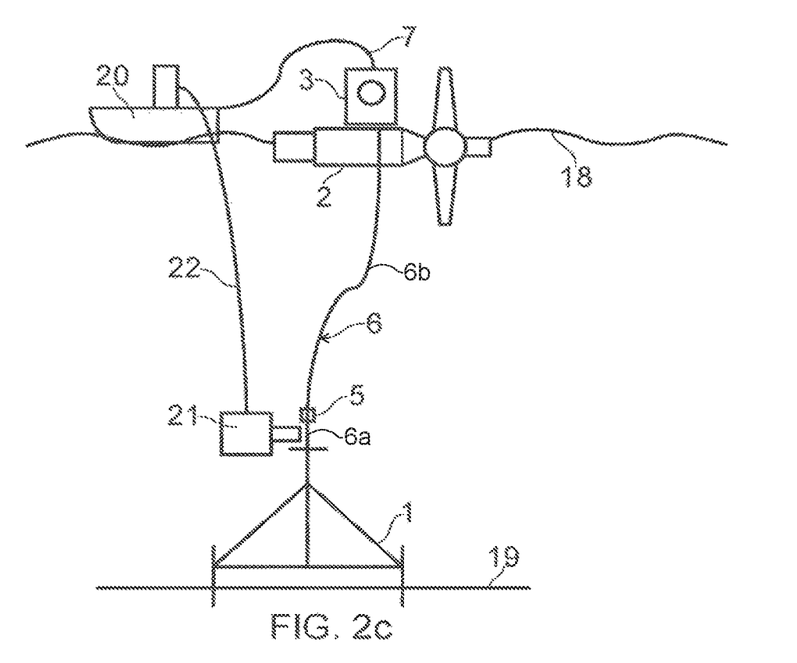

The ROV 21 connects the winch tether 6 to the support structure 1, as shown in FIG. 2c, such that a first portion 6a of the tether 6 is attached to the support structure and a second portion 6b of the tether 6 is coupled to the first portion 6a and is attached to the winching device 3. The winching device 3 operates to take up any slack in the tether (step 104), and the ROV releases its grip from the tether 6.

Figure 2D:
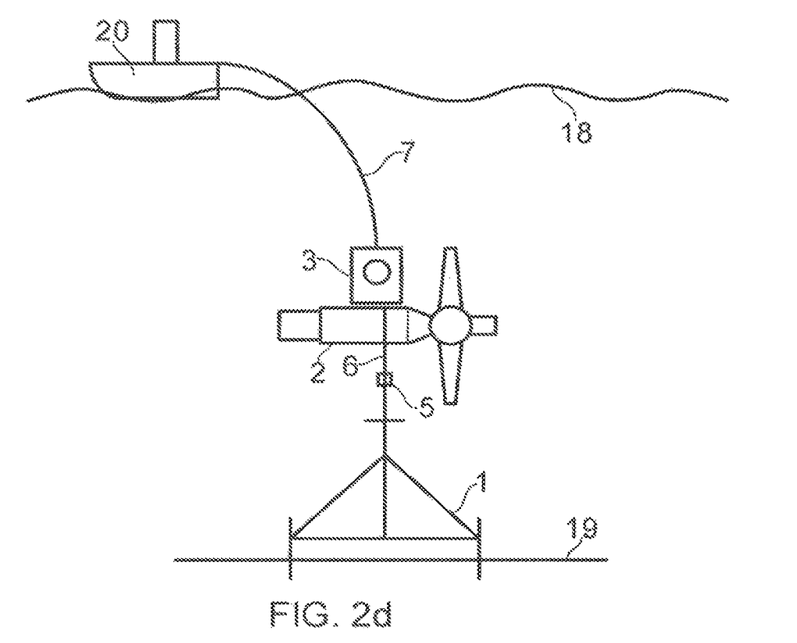

FIG. 2d (step 106) illustrates the winching device 3 operating to wind in the winch tether 6. Since the tether 6 is secured to the support structure 1, the winching device 3, and the power generating apparatus 2 are pulled down towards the support structure 1. The coupling device 5 passes through the power generating apparatus 2 prior to the power generating apparatus 2 docking with the support structure 1.

Figure 2E:
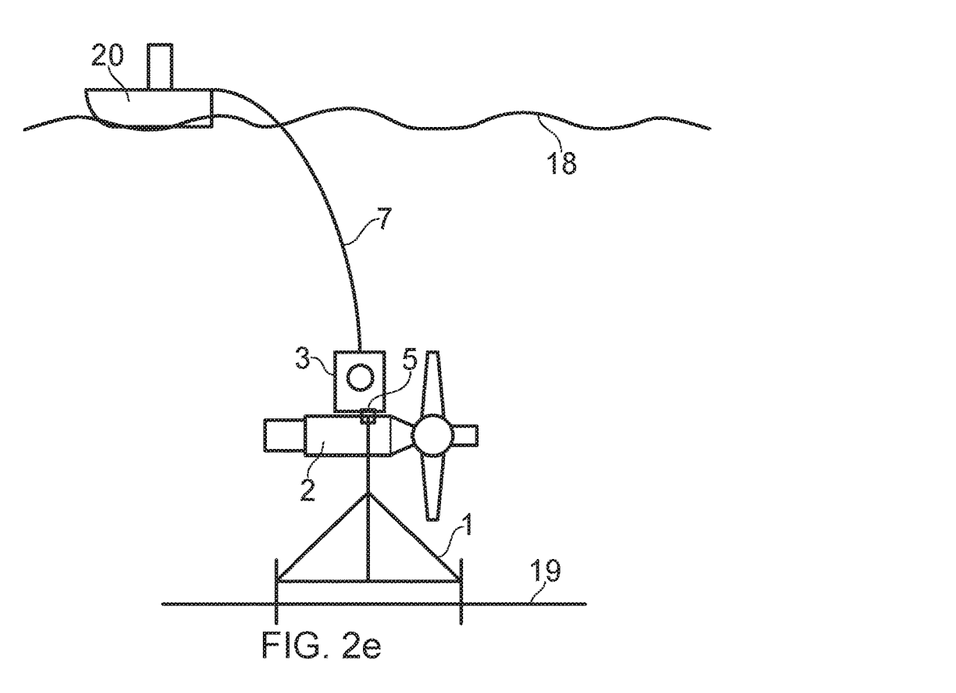

FIG. 2e shows the power generating apparatus 2 docked with the support structure 1.

Figure 2F:
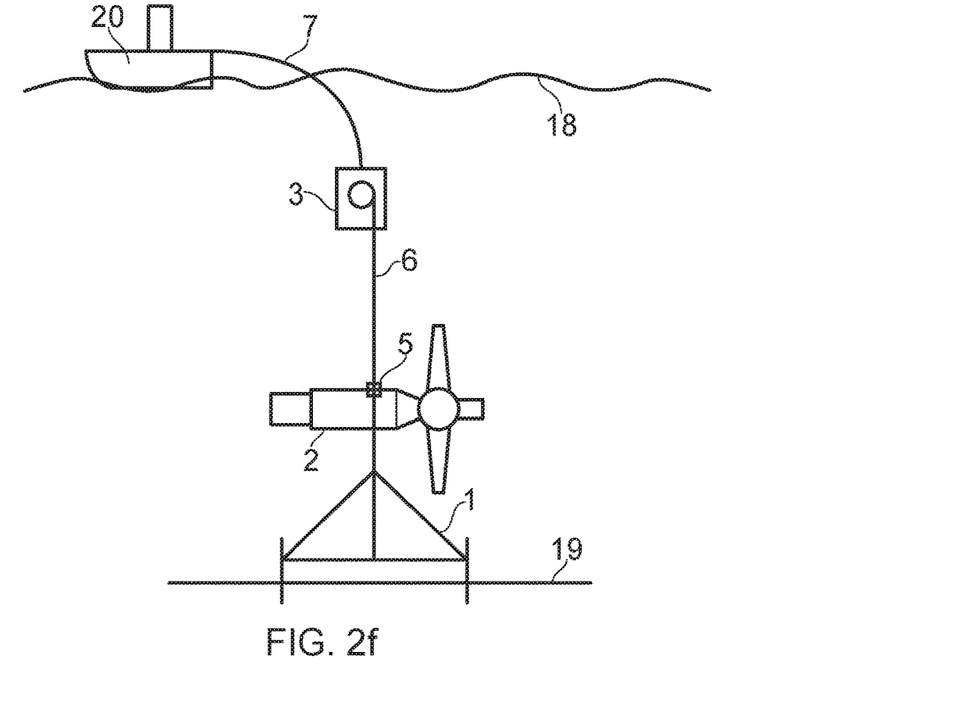
Figure 2G:
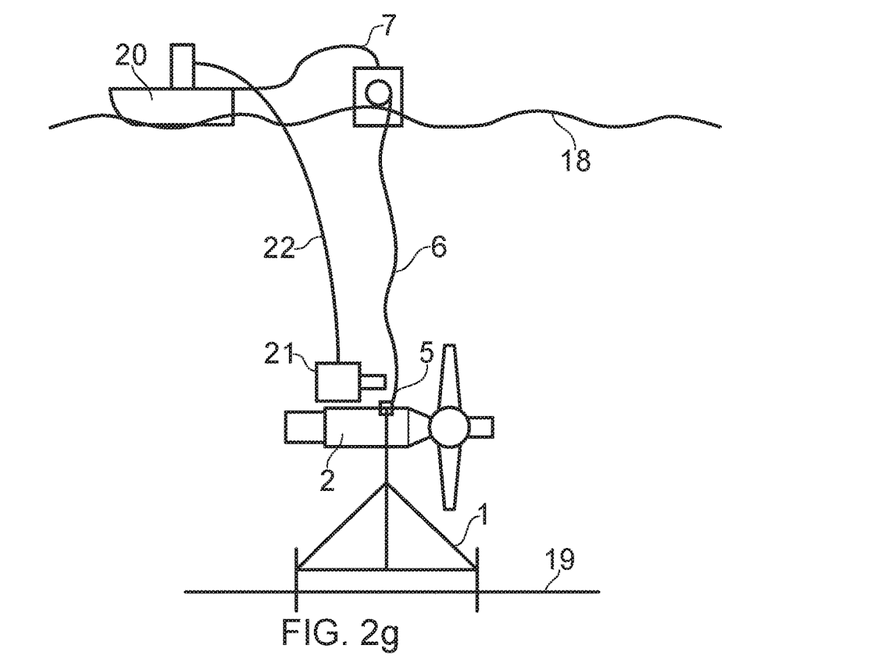

When docking (step 108) is complete, the winching device 3 releases its connections with the power generating apparatus 2 and pays out winch tether 6 for buoyant ascent of the winching device 3 to the surface 18, as shown in FIG. 2f (step 110). During the ascent of the winching device 3, the first and second portions of the winch tether remain connected to one another, such that the winch is attached to the support structure 1 to enable its ascent to be a controlled manoeuvre.

Figure 2H:
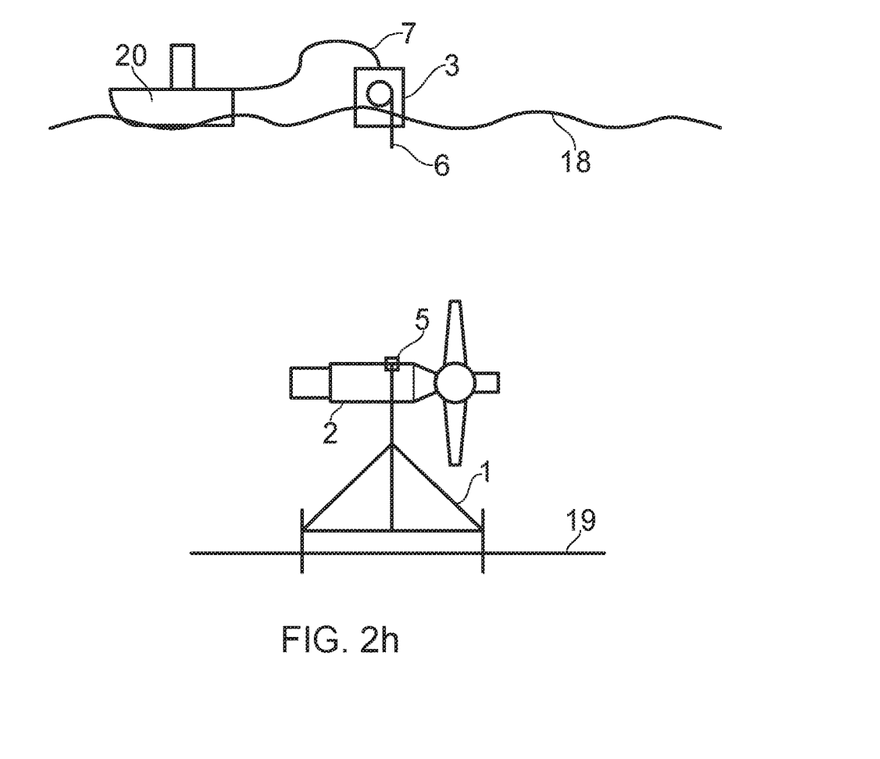

When the winching device 3 is on the surface, the ROV 21 disengages the coupling device 5 (FIG. 2g, step 112) and the second portion of the winch tether is retracted (FIG. 2h, step 114). The first portion of the winch tether, together with a first part of the coupling device 5 are left attached to the support structure 1. The first portion of the tether 6 remains extended through the aperture of the power generating apparatus 2. In one example, an upper end region of the first portion of the tether 6 is held in place on the power generating apparatus 2 by an engagement means located in an upper region of the power generating apparatus 2. Such and engagement means is arranged to allow the tether 6 to pass back through the power generating apparatus 2 when sufficient load is applied between the tether 6 and the power generating apparatus 2, for example during a retrieval operation. The first portion of the tether may be held in place on the power generating apparatus 2 by any other suitable means.

Preferably, the first portion of the tether, which remains attached to the support structure 1, includes a buoyant element in the vicinity of the upper end region of the tether 6, so that the first portion of the tether remains extended away from the support structure 1 when the power generating apparatus 2 is no longer present in order to prevent the tether 6 falling down onto the support structure 1, thus serving to prevent damage on the support structure 1 by the tether 6.

Figure 2I:
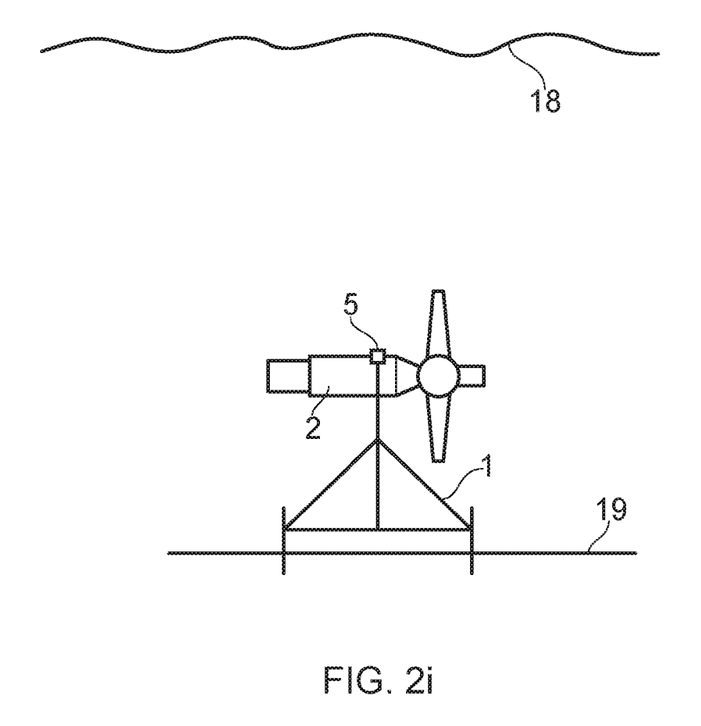
Figure 3:
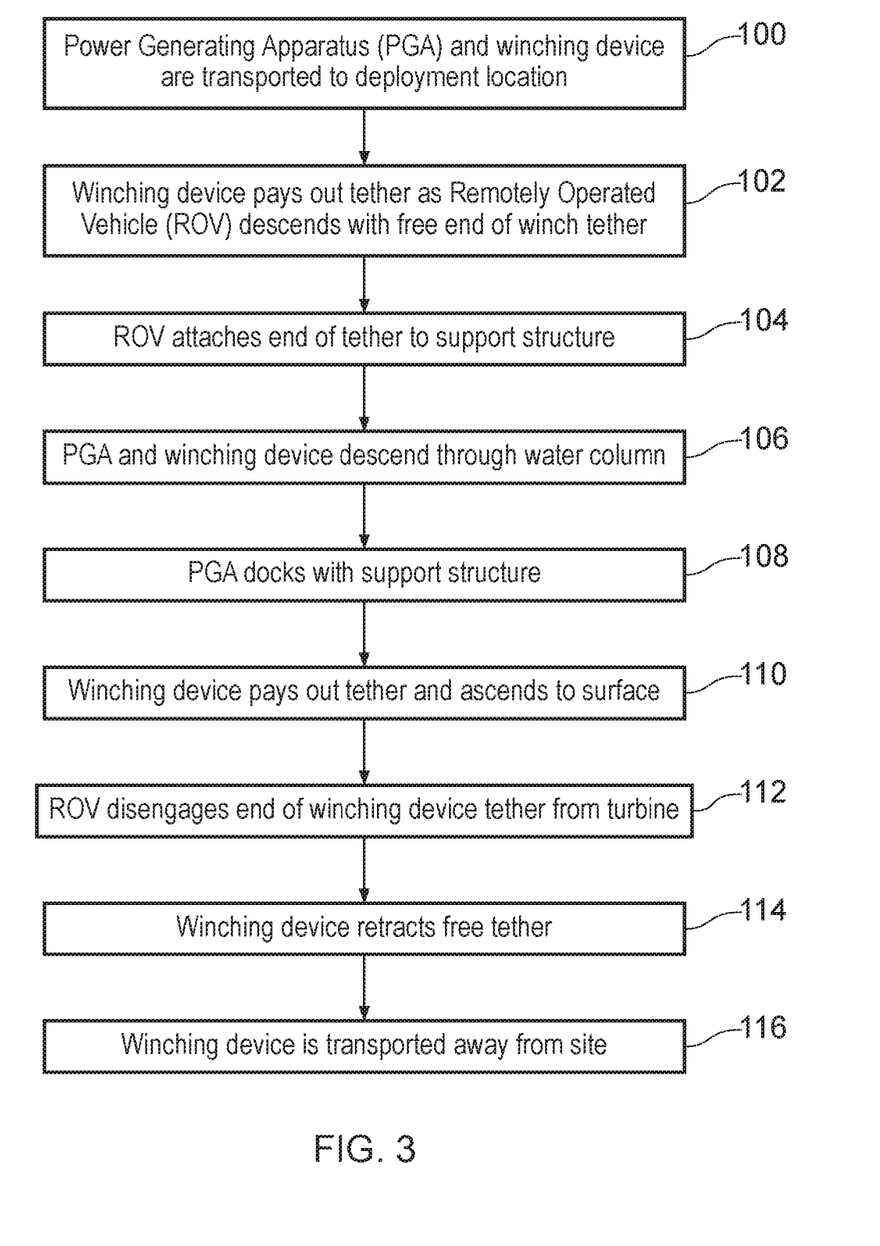
FIG. 3 is a flowchart showing the deployment steps illustrated in FIGS. 2a to 2i.

FIG. 2i shows the completed deployment operation and the winching device 3 is then returned (step 116) to storage or used for further marine operations.

Figure 4:
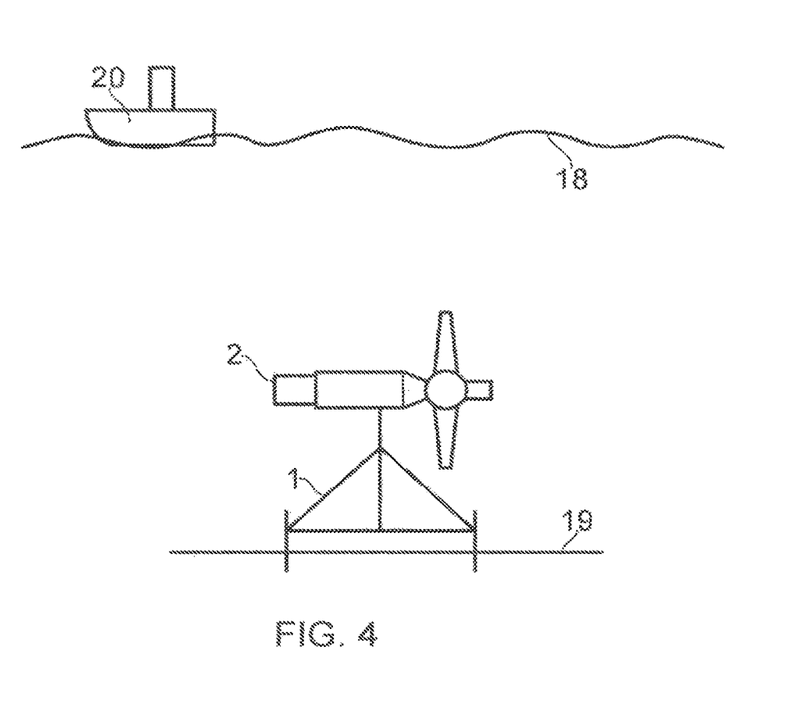
FIGS. 4 to 6 illustrate retrieval of part of the system of FIG. 1.
Figure 5:
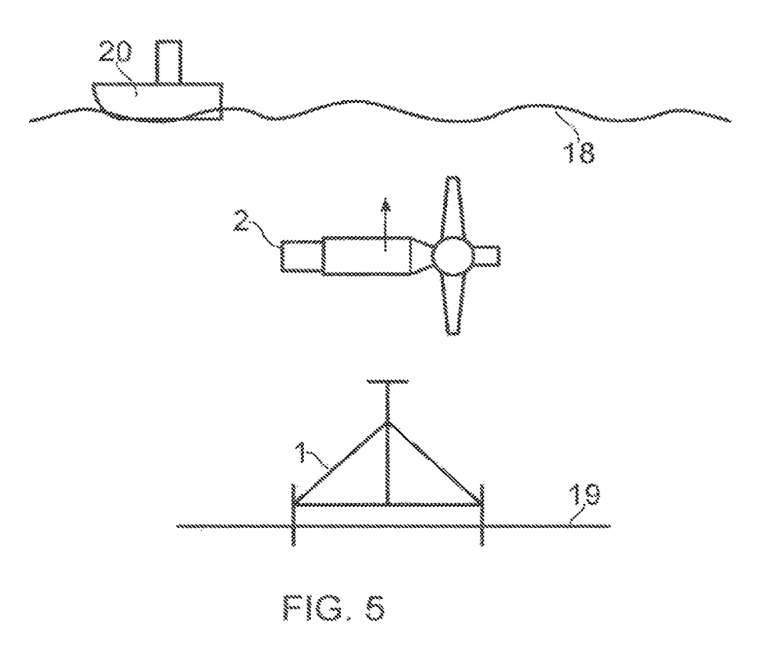
Figure 6:
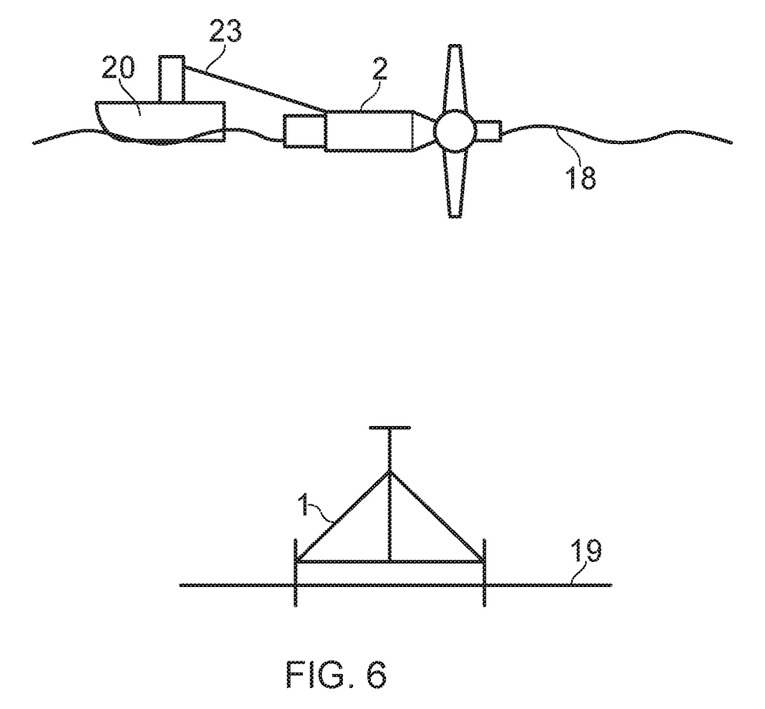

FIGS. 4 to 7 illustrate retrieval of the power generating apparatus from the support structure in accordance with a technique embodying an aspect of the present invention. FIG. 4 shows the power generating system (including the support structure 1 and power generating apparatus 2) ready for retrieval of the power generating apparatus 2 therefrom. It will be readily understood that the power generating apparatus 2 may have been deployed in accordance with the method described above, or by any other suitable method. A retrieval vessel 20 is deployed (step 120) on the water surface 18 to the vicinity of the power generating system located on the bed 19 of the body of water.

Figure 7:
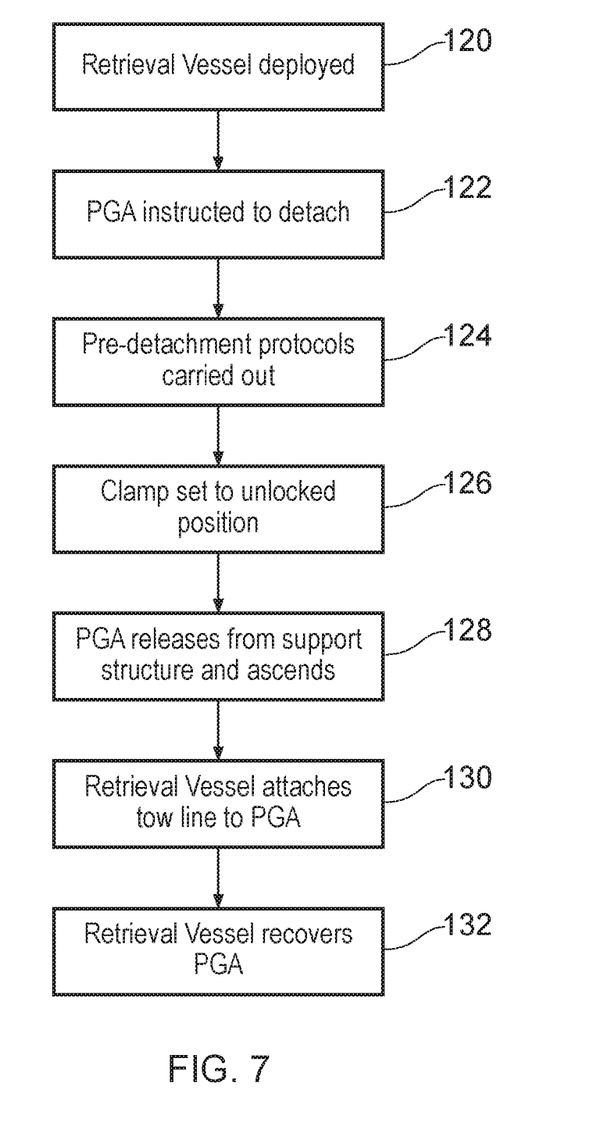
FIG. 7 is a flowchart showing steps in a retrieval process illustrated in FIGS. 4 to 6.

The power generating apparatus 2 is instructed to commence a detachment sequence from the support structure 1 (step 122). The instruction or instructions may be delivered to the power generating apparatus in any appropriate manner. In one example, the power generating apparatus has a control and monitoring connection with a central control system (both not shown for the sake of clarity) via a cable linked to the support structure 1. The cable is not shown for the sake of clarity. In another example, a control and power cable (umbilical) may be deployed from the retrieval vessel 20. The exact nature of the delivery of the instruction to detach is not material to the present invention.

Once the power generating apparatus 2 has received the instruction to commence detachment from the support structure, a suitable pre-detachment protocol is performed (step 124). This pre-detachment protocol is performed by a control unit within the power generating apparatus 2 in communication with a central control unit located, for example, on the retrieval vessel, or on another vessel, or at another location such as the shore. In a particular example, the protocol includes the following steps:

1. Determining that there is sufficient energy stored on board the power generating apparatus (for example in batteries or accumulators or similar) to be able to complete the required detachment actions (including disengaging connections from support structure, and releasing the clamping mechanism). The required energy level may include a contingency amount of stored energy to provide a reserve amount to reengage the power generating apparatus with the support structure if the operation needs to be aborted for any reason;
2. Determining that any electricity supply and/or power export connections are not live
3. Disconnecting the electricity supply connections, and any other connections (such as control and hydraulic connections) from the support structure Optionally, the process may include the following steps:
4. Transmitting the results of the protocol steps to the central control unit; and
5. Receiving confirmation of the instruction to detach from the central control unit Successful completion of these steps means that the power generating apparatus 2 is ready to ascend to the water surface 18.

Further steps may include obtaining early confirmation that the power generating apparatus is still buoyant (i.e. not critically flooded), using, for example, visual checks from on-board cameras, instrumentation such as proximity sensors that change during partial release of the clamp, strain gauges appropriately placed to indicate net upward force and/or water sensors for detecting the presence of water within the power generating apparatus 2.

The power generating apparatus 2 then releases the clamping mechanism, and checks that the clamping mechanism has been released using appropriate position, or other, sensors (step 126). Assuming that the clamping mechanism has released correctly, then the power generating apparatus 2 is in a detached state, and ascends (step 128) to the water surface 18, since the power generating apparatus 2 is buoyant. Sensors, such as proximity sensors and depth sensors can be used to determine that the power generating apparatus has started to ascend. If such ascent does not occur within a predetermined time frame, then the clamp can be reset to a locked position, so that the power generating apparatus 2 is secured once more to the support structure.

In an alternative example, the power generating apparatus 2 may be released by the use of an ROV to mechanically release the clamping mechanism. This is particularly useful for a power generating apparatus 2 with a failure that prevents use of the systems described above.

Once the power generating apparatus 2 reaches the water surface 18, the retrieval vessel 20 attaches a tow line 23 to the now floating power generating apparatus 2, and places the power generating apparatus 2 under control for recovery to an appropriate location (steps 130 and 132).

In accordance with the method embodying the present invention, the power generating apparatus 2 ascent is a controlled free ascent. The power generating apparatus 2 is designed to have positive buoyancy with mass and buoyancy distributions such that the ascent of the power generating apparatus 2 to the water surface 18 occurs with desirably low roll and pitch. The net buoyancy distribution is designed to take into account the effects of expected drag that will be experienced by the power generating apparatus 2 during ascent, of partial flooding of the power generating apparatus 2, and of marine growth on the power generating apparatus 2.

The ascent of the power generating apparatus 2 is free in the sense that there is no load bearing tether, or winch line, which lifts the power generating apparatus 2 or restricts the ascent of the power generating apparatus 2. In one example, at least one 'tag line' is secured to the power generating apparatus 2 from the vessel 20 prior to release (this could be the same item as the control umbilical if it was mechanically strong enough but this is not preferred), in order to restrict the horizontal movement of the power generating apparatus 2. That is, a tag line may be attached in advance of the ascent of the power generating apparatus 2, in order that currents, tides, or other conditions do not carry the power generating apparatus 2 away from a desired area of retrieval. The tag line does not restrict or control the vertical movement of the power generating apparatus 2.

The term "controlled" is used herein to refer to the power generating apparatus 2 being stable during the free ascent, for example having limited or reduced, for example minimal, roll and pitch during the free ascent without the application of external guiding threes. Preferably, the roll of the power generating apparatus is no more than a predetermined maximum value. Preferably, the pitch of the power generating apparatus is no more than a predetermined maximum value. Stabilisers may be provided on the power generating apparatus prior to ascent, in order to maintain the desired levels of roll and pitch. The stabilisers may be already part of the power generating apparatus, and may be moved from a stored position to a deployed position before ascent. Alternatively, fixed stabilisers may be provided on the power generating apparatus 2. In a further alternative, such stabilisers may be fitted to the power generating apparatus 2 when in its underwater position, for example by ROV operation. It will be appreciated that any appropriate number and type of stabilisers may be provided. The stabilisers may be passive, in the sense that they are fixed in position, or may be active in the sense that they adjust and move dependent upon conditions of the ascent.

The roll and pitch of the power generating apparatus during the free ascent to the surface may be measured in an appropriate manner, for example by the use of one or more inclinometers. The stability of the power generating apparatus 2 during the free ascent advantageously reduces the risk of damaging the support structure 1 and the power generating apparatus 2 or the risk of inversion of the power generating apparatus 2.

Allowing a large buoyant body such as the power generating apparatus to ascend freely to the surface is counterintuitive for marine engineers, who are specifically concerned about stability of the apparatus, horizontal 'flight', g-forces, collision risk for vessels, damage of interfacing parts, and damage to the apparatus and/or support structure or other infrastructure elements.

However, as described above, the techniques embodying the present invention enable the free ascent to be controlled, without the use of winch tethers, or lifting cables. Removing the need for such lifting or winching tethers speeds up the process by which the power generating apparatus can be retrieved from the support structure. Such a decrease in the amount of time taken to retrieve the apparatus has significant beneficial effects on the cost of retrieval.

In an alternative example, the speed of ascent of the power generating apparatus 2 is controlled by the power generating apparatus 2 being arranged to ascend up a line having a predetermined level of resistance to that motion, in order to provide a controlled ascent on the line (e.g. a buoyed line to the surface with a sliding 'stop' that the power generating apparatus 2 pushes up).

It will be readily appreciated that systems and techniques embodying the present invention are able to provide significant advantages over previously considered solutions for deployment and retrieval of underwater power generating apparatus.

Although aspects of the invention have been described with reference to the embodiment shown in the accompanying drawings, it is to be understood that the invention is not limited to the precise embodiment shown and that various changes and modifications may be effected without further inventive skill and effort.

The invention claimed is:

1. Power generating equipment comprising:
   a support structure adapted to be disposed on a bed of a body of water;
   a buoyant power generating apparatus having positive buoyancy releasably connectable to the support structure, the power generating apparatus being adapted to be released from the support structure and to make controlled free ascent to a surface of the body of water following such release;
   a winch releasably mounted on an upper surface of the power generating apparatus, the upper surface of the power generating apparatus being oriented towards a surface of the body of water; and
   a winch tether having a first portion that is releasably attachable to the support structure and a second portion that is releasably attachable to the first portion and that is coupled to the winch, the first portion extending through the power generating apparatus when the power generating apparatus is attached to the support structure,
   wherein the winch selectively pays out the first portion and the second portion of the winch tether.

2. Power generating equipment as claimed in claim 1, in which the power generating apparatus is a tidal turbine.

3. Power generating equipment as claimed in claim 1, in which the equipment further comprises an umbilical comprising a first end for attachment to the power generating apparatus and/or support structure and a second end for attachment to a retrieval structure, in which the umbilical is arranged in us to supply electrical power and/or control signals to control the releasable connection between the power generating apparatus and the support structure.

4. Power generating equipment as claimed in claim 1, in which the equipment further comprises an umbilical comprising a first end for attachment to the power generating apparatus and/or support structure and a second end for attachment to a retrieval structure, in which the umbilical is arranged in use to supply electrical power and/or control signals to control the releasable connection between the power generating apparatus and the support structure, and in which the first end of the umbilical is attached to the power generating apparatus.

5. Power generating equipment as claimed in claim 1, wherein the winch is releasable from the power generating apparatus when the power generating apparatus is attached to the support structure by the first portion of the winch tether.

6. Power generating equipment as claimed in claim 1, wherein the winch may selectively pay out the first portion of the winch tether when the first portion is attached to the second portion.

\* \* \* \* \*